United States Patent
Organek et al.

(10) Patent No.: US 6,561,332 B2
(45) Date of Patent: May 13, 2003

(54) BALL RAMP CLUTCH WITH FRICTIONAL DAMPING

(75) Inventors: Gregory J. Organek, Whitefish Bay, WI (US); David M. Preston, Clarkston, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/940,821

(22) Filed: Aug. 28, 2001

(65) Prior Publication Data

US 2002/0023816 A1 Feb. 28, 2002

Related U.S. Application Data

(63) Continuation-in-part of application No. 09/550,563, filed on Apr. 17, 2000, now abandoned.

(51) Int. Cl.[7] .................. F16D 27/115; F16D 45/00; F16D 47/04

(52) U.S. Cl. .............. 192/35; 192/48.92; 192/84.7; 192/84.91; 192/84.93; 192/84.96

(58) Field of Search ............... 192/35, 40, 48.2, 192/48.4, 48.92, 54.52, 70.23, 84.7, 84.91, 84.93, 84.96, 93 A

(56) References Cited

U.S. PATENT DOCUMENTS

| | | | |
|---|---|---|---|
| 1,974,390 A | 9/1934 | Eason | |
| 2,045,086 A | 6/1936 | Kastner | |
| 2,091,270 A | 8/1937 | Colman | |
| 2,605,877 A | 8/1952 | Winther | |
| 2,623,619 A | * 12/1952 | Clerk | 192/35 |
| 2,649,941 A | 8/1953 | Doebeli | |
| 2,738,045 A | 3/1956 | Mergen et al. | |
| 2,816,636 A | 12/1957 | Weibel, Jr. | |
| 2,861,225 A | 11/1958 | Mergen | |
| 2,933,171 A | 4/1960 | Kraeplin | |
| 2,937,729 A | 5/1960 | Sperr, Jr. | |
| 3,000,479 A | 9/1961 | Mosbacher | |
| 3,404,585 A | 10/1968 | Roper | |
| 4,079,821 A | 3/1978 | Miller | |
| 4,286,701 A | 9/1981 | MacDonald | |
| 4,343,386 A | 8/1982 | Schaefer | |

(List continued on next page.)

FOREIGN PATENT DOCUMENTS

| | | |
|---|---|---|
| CA | 1123765 | 5/1982 |
| DE | 42 07 640 A1 | 9/1993 |
| EP | 0 548 488 | 10/1992 |
| EP | 0 669 479 A1 * | 8/1995 |
| EP | 1 081 402 | 3/2001 |
| GB | 2181500 | 4/1987 |
| GB | 2 235 957 B | 6/1993 |
| GB | 2315531 | 2/1998 |
| JP | 58-146723 | 9/1983 |

*Primary Examiner*—Rodney H. Bonck
(74) *Attorney, Agent, or Firm*—Loren H. Uthoff, Jr.

(57) ABSTRACT

A ball ramp mechanism is used to apply a clamping load to a clutch pack to rotationally couple an input shaft to an output shaft. The ball ramp mechanism is comprised of a control plate having a control extension radially extending therefrom and an activation plate having an activation extension radially extending therefrom and an intermediate plate disposed between the control extension and the activation extension where the control extension and the activation extension and the intermediate plate are frictionally rotationally coupled upon application of an electromagnetic field generated by a stationary coil acting through a rotating coil armature to activate the ball ramp mechanism. A gap sleeve contacts the control plate and the activation extension to limit the separation between the control extension, the intermediate plate and the activation extension. The activation plate is mounted to the input shaft through a first one-way clutch and the coil armature is mounted to the input shaft through a second one-way clutch when the first one-way clutch is oriented opposite to the second one-way clutch.

35 Claims, 9 Drawing Sheets

U.S. PATENT DOCUMENTS

| | | |
|---|---|---|
| 4,415,073 A | 11/1983 | Campbell et al. |
| 4,550,817 A | 11/1985 | Euler |
| 4,645,049 A | 2/1987 | Matsuda et al. |
| 4,690,258 A | 9/1987 | Teraoka et al. |
| 4,718,303 A | 1/1988 | Fogelberg |
| 4,850,458 A | 7/1989 | Allan |
| 4,860,869 A * | 8/1989 | Hall, III ............... 188/134 |
| 4,878,567 A | 11/1989 | Buckley et al. |
| 4,898,265 A | 2/1990 | Metcalf |
| 4,909,363 A | 3/1990 | Trommer |
| 5,070,975 A | 12/1991 | Tanaka et al. |
| 5,078,249 A | 1/1992 | Botterill |
| 5,092,825 A | 3/1992 | Goscenski, Jr. |
| 5,106,349 A | 4/1992 | Botterill et al. |
| 5,160,004 A | 11/1992 | Scott et al. |
| 5,199,538 A | 4/1993 | Fischer |
| 5,435,201 A | 7/1995 | Preston et al. |
| 5,441,137 A | 8/1995 | Organek et al. |
| 5,469,948 A | 11/1995 | Organek et al. |
| 5,485,904 A | 1/1996 | Organek et al. |
| 5,499,951 A | 3/1996 | Showalter |
| 5,505,285 A | 4/1996 | Organek |
| 5,528,950 A | 6/1996 | Organek et al. |
| 5,638,933 A | 6/1997 | Matsumoto |
| 5,651,437 A | 7/1997 | Organek et al. |
| 5,713,445 A | 2/1998 | Davis et al. |
| 5,713,446 A | 2/1998 | Organek et al. |
| 5,802,915 A | 9/1998 | Organek et al. |
| 5,810,141 A | 9/1998 | Organek et al. |
| 5,819,883 A | 10/1998 | Organek et la. |
| 5,910,061 A | 6/1999 | Organek et al. |
| 5,911,643 A | 6/1999 | Godlew et al. |
| 5,947,857 A | 9/1999 | Organek et al. |
| 5,953,959 A | 9/1999 | Organek et al. |
| 5,954,173 A | 9/1999 | Sakai et al. |
| 5,960,916 A | 10/1999 | Organek et al. |
| 5,964,330 A | 10/1999 | Organek et al. |
| RE36,502 E | 1/2000 | Organek et al. |
| 6,082,504 A | 7/2000 | Organek et al. |
| 6,109,408 A | 8/2000 | Ikeda et al. |
| 6,158,561 A * | 12/2000 | Sakai et al. ............ 192/84.7 |
| 6,206,159 B1 * | 3/2001 | Takuno et al. .......... 192/84.7 |
| 6,250,445 B1 | 6/2001 | Davis |

* cited by examiner

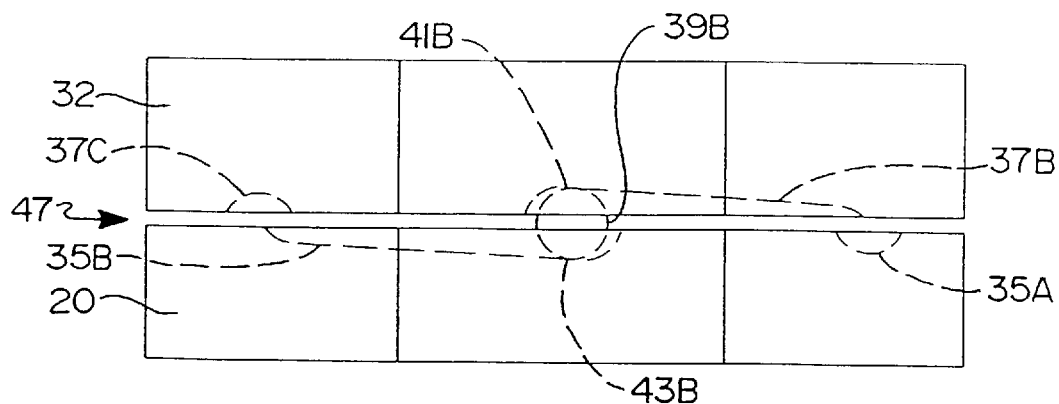
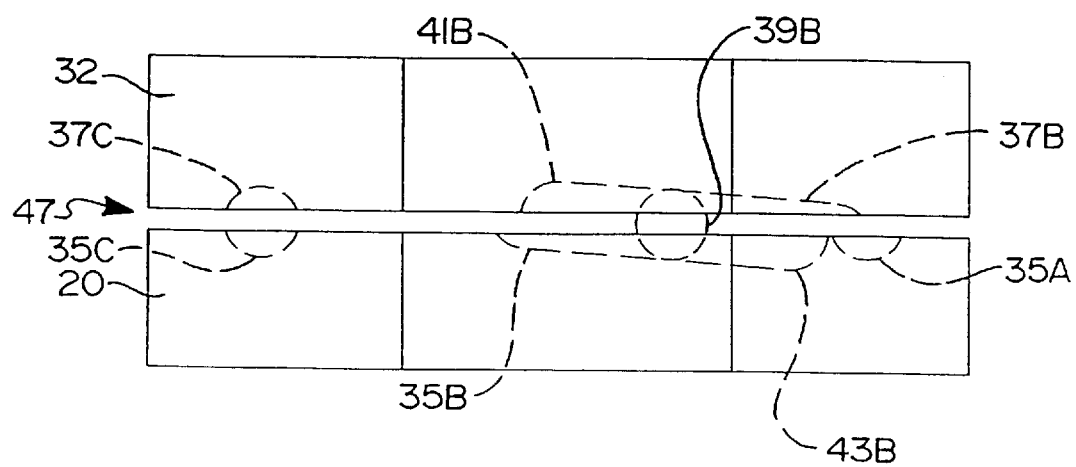

BALL RAMP CLUTCH WITH FRICTIONAL DAMPING

RELATED APPLICATIONS

This is a continuation-in-part of application U.S. Ser. No. 09/550,563 filed on Apr. 17, 2000 now abandoned.

FIELD OF THE INVENTION

The present invention relates to a vehicle driveline clutch actuator which utilizes a ball ramp mechanism to load a clutch pack and more specifically to a vehicle driveline clutch actuator using a ball ramp mechanism having an intermediate plate interposed between a control plate and an activation plate to load a clutch pack where a pair of one-way clutches are used to provide continuous clutch engagement.

PRIOR ART

Driveline master clutches commonly use a plurality of springs to clamp a friction disc to an engine flywheel. The clamping springs are normally disposed within a pressure plate assembly which is bolted to the flywheel. The friction discs are splined to rotate with a transmission input shaft which when rotated, provides motive power to the driveline and wheels. A mechanical linkage operated by a driver is used to control the operation of the master clutch.

Efforts to automate the operation of the master clutch to take the place of the driver are currently underway. It is known to make use of a hydraulic actuator or an electric motor to operate the master clutch release mechanism in response to a control signal generated by a control microprocessor in response to a multiplicity of sensor outputs which are used to determine the vehicle operating conditions and hence the desired operation of the master clutch.

The use of a ball ramp actuator to operate a driveline master clutch is known in the art. U.S. Pat. Nos. 5,441,137; 5,469,948; 5,505,285; 5,651,437; 5,810,141; 5,910,061; 5,964,330; and RE 36,502 assigned to the same assignee as this application, all of which are hereby expressly incorporated by reference, disclose methods of using a ball ramp actuator to supply the clamping force on a clutch disc which can be used to frictionally rotationally connect the engine flywheel to the transmission input shaft. The ball ramp actuator is activated when a electrical current is supplied to a coil thereby producing an electromagnetic field in a coil pole which applies a retarding force to a rotating armature. The rotating armature is commonly nonrotatably connected to an annular control plate which has a plurality of control ramps which vary in depth. An opposed annular activation plate has a like number of opposed variable depth activation ramps where a corresponding number of rolling elements are trapped between the control and activation ramps. As the retarding force is applied to the control plate, the rotational movement of the control plate relative to the activation plate causes the rolling elements to traverse the control ramps and the activation ramps thereby causing an increase in separation distance between the control and activation plates to provide the clutch disc clamping force.

Also shown in the prior art are other types of vehicle driveline devices which make use of a ball ramp mechanism to provide a clamping load to a clutch pack. U.S. Pat No. 5,092,825 discloses a limited slip differential having a clutch pack loaded by a ball ramp actuator. U.S. Pat. No. 5,499,951 discloses a driveline transfer case where the torque split is controlled by a ball ramp actuator. U.S. Pat. No. 5,528,950 discloses a transmission inertia brake where a ball ramp actuator loads a clutch pack to slow a spinning transmission shaft. U. S. Pat. No. 5,819,883 discloses a driveline retarder in which a ball ramp actuator is used to load a clutch pack to rotate a hydraulic pump in response to a signal from a control unit. The disclosures of U.S. Pat. Nos. 5,092,825; 5,499,951; 5,528,950 and 5,819,883 are all hereby incorporated by reference.

In the prior art, operation of the master clutch or other driveline coupling system such as a differential or transfer case could be improved by improving the inherent mechanical stability of the ball ramp. It would also be an advantage if the clutch remained fully engaged irregardless of the direction of the flow of torque through the clutch while using a ball ramp mechanism with unidirectional ramps in the control and activation plates.

SUMMARY OF THE INVENTION

The present invention results in an improvement in the operational characteristics of a ball ramp actuator which can be used in a variety of vehicle driveline applications to supply a clamping load to a frictional clutch pack. The present invention provides a unidirectional apply ball ramp function along with significantly increased frictional damping in the ball ramp mechanism to control and stabilize the ball ramp mechanism and thereby improve the operation of the master clutch or other driveline device.

One-way clutches are used to control the rotational direction of the coil armature and the rotational direction of the activation plate to provide a continuous clutch apply function using unilateral grooves in the control plate and activation plate where the clutch clamping load is maintained irregardless of the direction of torque flow in the clutch assembly. The operating direction of the one-way clutches are oriented in opposite directions.

To improve the operation of the ball ramp mechanism, the stability is improved by significantly increasing the frictional damping using an intermediate plate disposed between the activation plate and the control plate where the intermediate plate rotates with the input shaft and hub. Note that the torque flow from the input shaft to the output shaft can be reversed so that the torque flows from the output shaft to the input shaft. The coil assembly generates an electromagnetic force that frictionally rotationally couples the coil armature, the control plate, the intermediate plate and the activation plate together. The one-way clutches are oriented to only allow the coil armature to rotate in an opposite direction from that of the activation plate. The activation plate rotates on a first one-way clutch on the output shaft while the intermediate plate is driven by the hub and the coil pole rotates on a second one-way clutch also on the output shaft.

One provision of the present invention is to provide a ball ramp actuator to load a clutch pack.

Another provision of the present invention is to provide a ball ramp actuator to load a clutch pack where the clutch clamp load is maintained irregardless of the direction of driveline torque flow.

Another provision of the present invention is to provide a ball ramp actuator to load a clutch pack where the frictional damping of the ball ramp control system is substantially increased to improve operation.

Still another provision of the present invention is to provide a ball ramp actuator to load a driveline master clutch disc having improved operational characteristics.

BRIEF DESCRIPTION OF THE DRAWINGS

FIG. 3 is an illustrative partial view of the nonactivated ball ramp mechanism of the present invention taken along line III—III of FIG. 2;

FIG. 4 is an illustrative partial view of the activated ball ramp mechanism of the present invention taken along line III—Ill of FIG. 2;

DETAILED DESCRIPTION OF THE PREFERRED EMBODIMENTS

Figure 1:
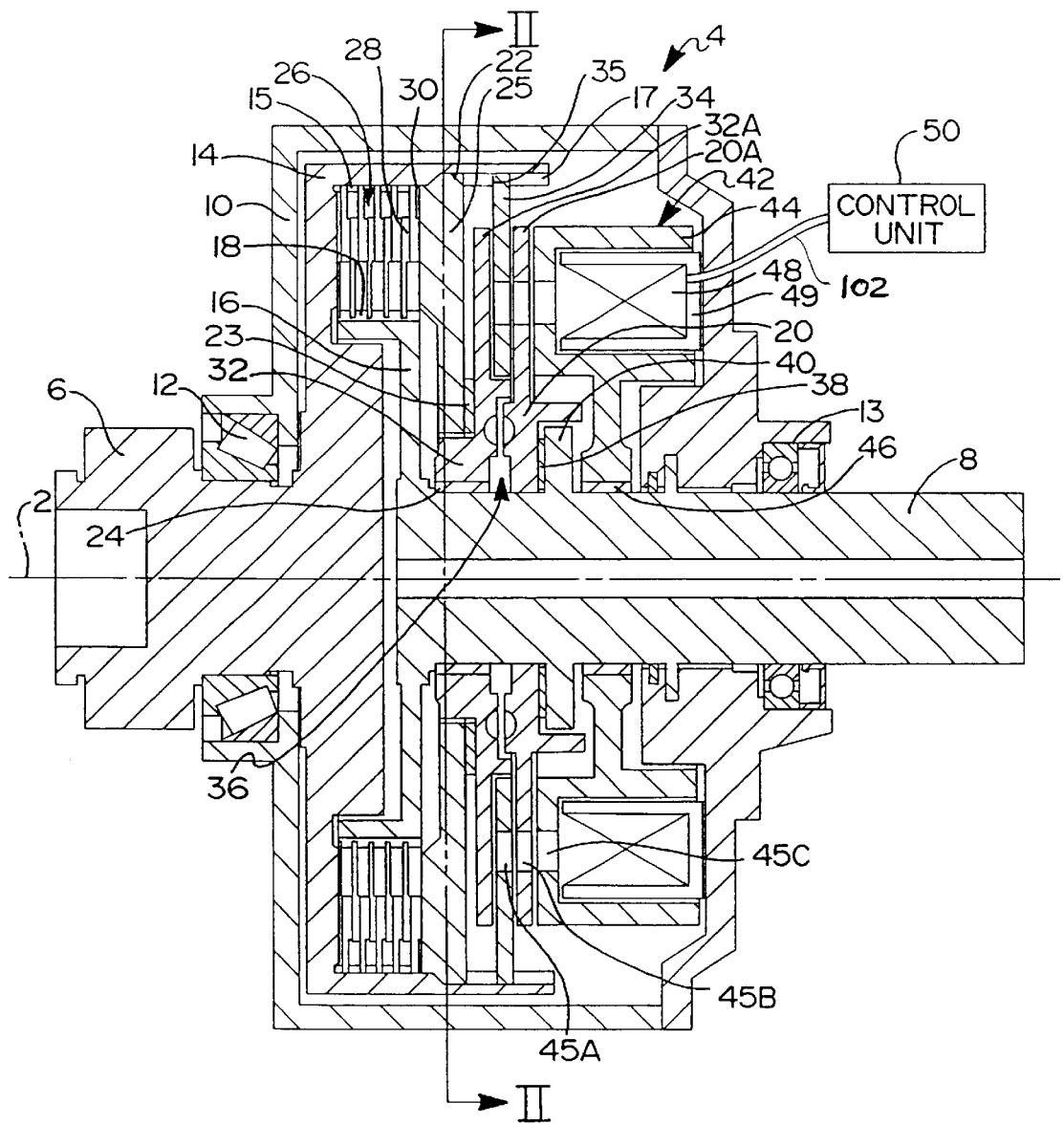
FIG. 1 is a cross-sectional view of the clutch assembly of the present invention.

For the purposes of promoting an understanding of the principles of the invention, reference will now be made to the three embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Certain terminology will be used in the following description for convenience in reference only and will not be limiting. The terms "rightward" and "leftward" will refer to directions in the drawings in connection with which the terminology is used. The terms "inwardly" and "outwardly" will refer to directions toward and away from, respectively, the geometric center of the apparatus. The terms "upward" and "downward" will refer to directions as taken in the drawings in connection with which the terminology is used. All foregoing terms mentioned above include the normal derivatives and equivalents thereof.

Although primarily described for use in a vehicle driveline, the present invention can be used to rotationally correct any two rotatable shafts in response to a control signal. Such alternative devices could include differentials, engine retarders, transmission brakes, foundation brakes, inertia brakes, transfer cases and other devices.

Now referring to FIG. 1, a cross-sectional view of the clutch assembly 4 of the present invention is shown. An input shaft 6 is connected to a rotatable power source such as an internal combustion engine (not shown) and the clutch assembly 4 functions to rotationally link the input shaft 6 to output shaft 8 which, as an example, could be the input shaft to a transmission. The elements of the clutch assembly 4 generally rotate and are symmetrical around an axis of rotation 2. A housing 10 is supported by the input shaft 6 through first bearing 12 and by the output shaft 8 through second bearing 13. The input shaft 6 is attached to a clutch hub 14 which has a plurality of splines 15 on an inner surface of the clutch hub 14 and on the drive hub extension 17. The output shaft 8 is attached to a hub 16 which has a plurality of splines 18 formed on the outside peripheral surface. The connotation of the terms "input shaft" and "output shaft" are interchangeable depending on the direction of torque flow through the clutch assembly 4.

The ball ramp mechanism 36 is comprised of a control plate 20, an activation plate 32 and the rolling elements 39A, 39B, 39C (see FIG. 2) which separate the control plate 20 and the activation plate 32 depending on their relative position in respective ramps 35A, 35B, 35C and 37A, 37B, 37C. As the activation plate 32 moves away from the control plate 20 it acts through thrust bearing 23 to apply a force on the pressure plate 25 so as to compress the clutch pack 26 to provide a frictional rotational link between the clutch hub 14 and the hub 16. The clutch pack 26 is comprised of a plurality of drive plates 30 which are nonrotatably connected to the clutch hub 14 by splines 15 and a plurality of driven plates 28 which are nonrotationally connected to the hub 16 by splines 18 thereby allowing relative axial movement. Again, the connotation of the terms "driven plates" and "drive plates" depends on the direction of the flow of torque through the driveline. If the engine is powering the vehicle, then the connotation of the terminology is traditional whereas when the vehicle is being braked by the engine, then the connotation must be reversed.

An intermediate plate 34 is rotatably connected to the clutch hub 14 through splined drive 35 as is the pressure plate 25 through splined drive 22. The intermediate plate 34 extends to be positioned between the control extension 20A and the activation extension 32A. The control extension 20A is flexibly attached to the control plate 20 and the activation extension 32A is flexibly attached to the activation plate 32. The flexibility of the control extension 20A and the activation extension 32A allow the control plate 20 and the activation plate 32 to move while the control extension 20A, the intermediate plate 34 and the activation extension 32A remain in contact. The control plate 20 is axially restrained by a thrust bearing 38 which reacts against a shaft flange 40 which is attached to the output shaft 8. More specifically, the control plate 20 includes a control extension 20A which radially extends and magnetically interacts with both the coil armature 44 and the intermediate plate 34. The activation plate 32 includes an activation extension 32A which radially extends and magnetically and frictionally interacts with the intermediate plate 34. The intermediate plate 34 is disposed between the control extension 20A and the activation extension 32A. The control extension 20A, the intermediate plate 34 and the activation extension 32A contact one another directly or a friction material can be attached to either or both of the surfaces of the control extension 20A, the intermediate plate 34 or the activation extension 32A. Slots 45A, 45B and 45C are formed in the intermediate plate 34, the control extension 20A, and the armature 44 respectively to provide a proper magnetic circuit when the coil 48 is electrically energized by the control unit 50 through signal wires 102.

A first one-way clutch 24 is used to support the activation plate 32 on the output shaft 8. The first one-way clutch 24 is oriented to lock the rotation of the activation plate 32 when the input shaft 6 is rotating in a direction such as when the engine is powering the vehicle and the driveline torque flows from the input shaft 6 to drive the output shaft 8.

A second one-way clutch 46 is used to support the coil armature 44 on the output shaft 8. The second one-way clutch 46 is oriented opposite to the first one-way clutch 24 to lock the rotation of the control plate 20 when the input shaft 6 is rotating in a direction such as when the engine is braking the vehicle and the torque flow through the driveline is reversed from that described supra.

A coil assembly 42 is electrically energized by a control unit 50 through signal wires 102 to produce an electromagnetic field to activate the ball ramp mechanism 36. The coil assembly 42 is comprised of a coil 48 that is mounted to the housing 10, a coil stator 49 which is partially surrounded by a coil armature 44. Both the coil stator 49 and the coil armature 44 are made of a ferro magnetic material to allow conduction of electromagnetic fields therein.

When the coil assembly 42 is energized, the control plate 20 through the control extension 20A, the intermediate plate 34 and the activation plate 32 through the activation extension 32A are electromagnetically drawn together to become frictionally and thereby rotationally linked. Some slippage can occur depending on the axial loading, the coefficient of friction of the material and the torque transfer. This configuration in combination with the operation of the first and second one-way clutches 24 and 46 results in a ball ramp mechanism 36 having a higher level of damping for improved operation that will remain engaged even if the direction of torque transfer is reversed.

Figure 2:
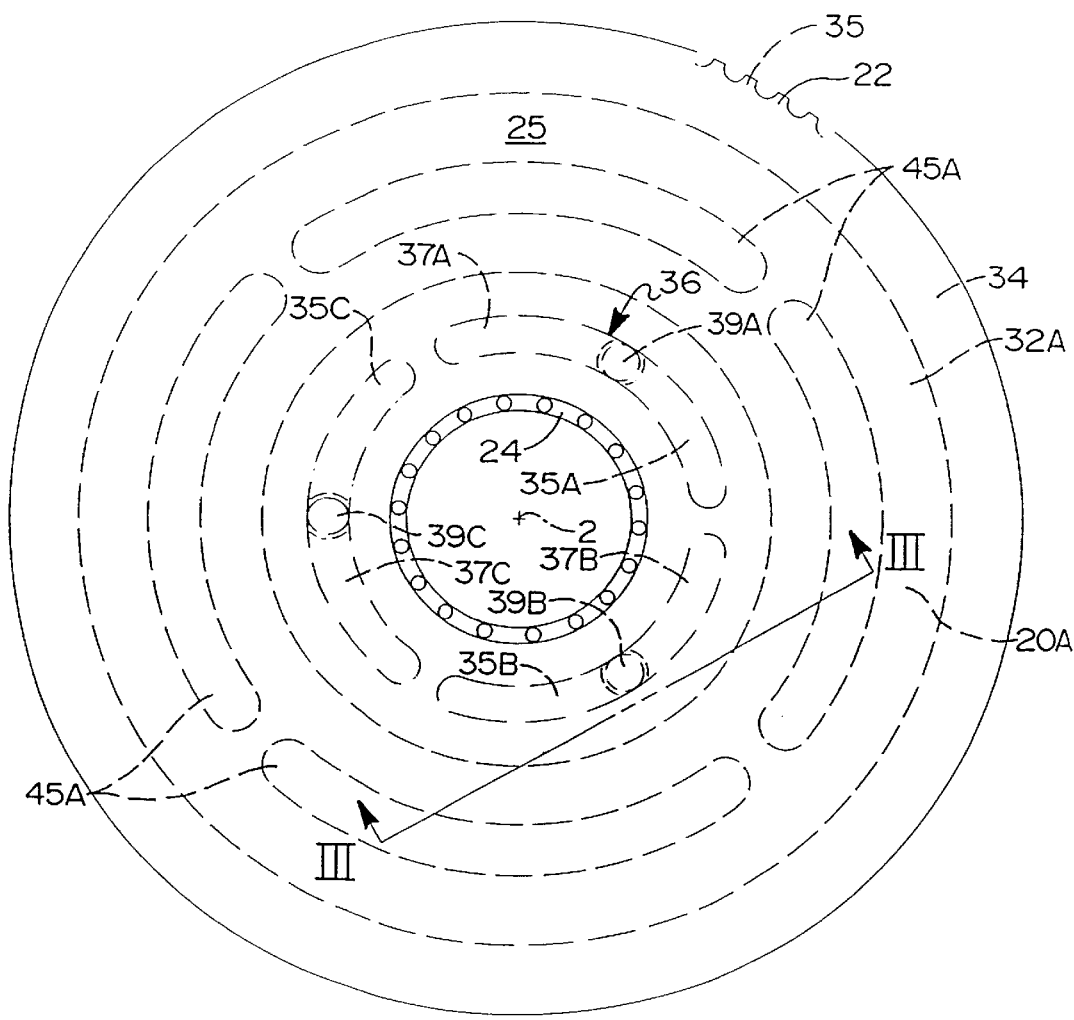
FIG. 2 is a sectional view of the ball ramp clutch of the present invention taken along line II—II of FIG. 1.

Now referring to FIG. 2 of the drawings, a partial sectional view of the clutch assembly 4 of the present invention taken along line II—II is shown. The pressure plate 25 is shaped to engage the drive hub extension 17 by the splined drive 22. In a like manner, the intermediate plate 34 is shaped to engage the drive hub extension 17 by the splined drive 35. By using splined drives 22 and 35, the pressure plate 25 and the intermediate plate 34 are nonrotationally coupled to the clutch hub 14 while axial movement is allowed as required.

More clearly illustrated are the control ramps 35A, 35B, 35C formed in the control plate 20 and the activation ramps 37A, 37B, 37C formed in the activation plate 32. The control ramps 35A, 35B, 35C at least partially oppose the activation ramps 37A, 37B, 37C and both are of variable depth increasing from one end to the other. Rolling elements 39A, 39B, 39C simultaneously contact and roll along respective opposed control ramps 35A, 35B, 35C and activation ramps 37A, 37B, 37C. The rolling elements 39A, 39B, 39C are shown in a nonactivated position where each contacts a respective control and activation ramp 35A, 35B, 35C; 37A, 37B, 37C at their lowest depth (and minimum overlap) thereby minimizing the separation distance 47 (see FIG. 3). As the ball ramp mechanism 36 is activated by electronically energizing the coil 48, assuming there exists slippage in the clutch pack 26, the control plate 20 moves counterclockwise relative to the activation plate 32 thereby causing the rolling elements 39A, 39B, 39C to transverse the three respective pairs of opposed variable depth control ramps 35A, 35B, 35C and activation ramps 37A, 37B, 37C. As the control plate 20 continues to rotate relative to the activation plate 32, the separation distance 47 increases thereby increasing the clamp force on the clutch pack 26.

Now referring to FIGS. 3 and 4 of the drawings, an illustrative cross-sectional view of the ball ramp mechanism 36 of the present invention taken along line III—III of FIG. 2 is shown. FIG. 3 shows the ball ramp mechanism 36 in a nonactivated state and FIG. 4 shows the ball ramp mechanism 36 in an activated state at about fifty percent travel.

In FIG. 3, the rolling element 39B is positioned at the maximum depth of both the control ramp 35B and the opposed activation ramp 37B and the separation distance 47 is at a minimum. Reference point 41B is on the activation ramp 37B and reference point 43B is on the control ramp 35B for use in comparison to their positions in FIG. 4.

In FIG. 4, the rolling element 39B has traversed both the control ramp 35B and the activation ramp 37B as the control plate 20 has been rotated relative to the activation plate 32. The separation distance 47 has increased since the rolling element 39B is now contacting a more shallow portion of both the control ramp 35B and the activation ramp 37B. The relative position of reference points 41B and 43B illustrate the relative rotation Operation Consider the situation when the torque flow is from the input shaft 6 to the output shaft 8 where both the input and output shafts 6, 8 are both rotating clockwise as viewed from the input shaft 6 and the coil assembly 42 is energized. This condition is analogous to a vehicle being powered by the engine where the clutch assembly 4 is functioning as a master clutch. The first one-way clutch 24 becomes locked and the second one-way clutch 46 becomes unlocked to allow relative rotation between the control plate 20 and the activation plate 32 in a direction to further expand the ball ramp mechanism 36. The control plate 20 is frictionally connected to the coil armature 44 through the control extension 20A which is allowed to rotate at or slower relative to the output shaft 8 by the one-way clutch 46 which is unlocked (i.e. the input shaft 6 and output shaft 8 are rotating clockwise while the coil armature 44 is free to rotate relative to the output shaft 8 in a counterclockwise direction). Thus, the coil armature 44 can rotate at or slower than the speed of the output shaft 8.

The intermediate plate 34 is rotating with the input shaft 6 while the activation plate 32 is locked by the first one-way clutch 24 to rotate with the output shaft 8. If there is slippage occurring in the clutch pack 26, then the input shaft 6 will be rotating at a slightly higher speed than the output shaft 8. Thus, the intermediate plate 34 will be rotating faster than the output shaft 8 but the control plate 20 cannot rotate faster than the output shaft 8 because it is magnetically/frictionally coupled to the coil armature 44 through the control extension 20A which is only allowed to rotated at the speed of the output shaft 8 or slower. The intermediate plate 34 is also frictionally coupled to the activation plate 32 through the activation extension 32A which is allowed to rotate at or faster than the output shaft 8 because the first one-way clutch 24 is locked. Thus, if there is slippage in the clutch pack 26 then the input shaft 6 is rotating faster than the output shaft 8 and the activation plate 32 will rotate faster than the control plate 20 (at least for a short time) which will further activate the ball ramp mechanism 36 and increase the separation distance 47 between the control plate 20 and the activation plate 32. The increased separation will increase the clamp load on the clutch pack 26 by axial movement of the pressure plate 25. This will in turn reduce the amount of slippage in the clutch pack 26 and improve rotational coupling between the input shaft 6 and the output shaft 8.

Now consider the situation when the torque flow is reversed from the preceding example and the output shaft 8 is attempting to rotate faster than the input shaft 6. When the clutch assembly 4 is functioning as a master clutch, this situation is analogous to a vehicle which is under engine braking. Both the input shaft 6 and the output shaft 8 are still rotating clockwise and the coil assembly 42 is energized. The first one-way clutch 24 becomes unlocked and the second one-way clutch 46 becomes locked to allow relative rotation between the control plate 20 and the activation plate 32 in a direction to farther expand the ball ramp mechanism 36. When the coil 48 is electrically energized, the control plate 20 is frictionally connected to the coil armature 44 through the control extension 20A which is rotationally connected to the output shaft 8 by the locked second one-way clutch 46. Thus, the coil armature 44 and the control plate 20 will rotate at least as fast as the output shaft 8. The intermediate plate 34 is rotating with the input shaft 6 which is rotating at a slightly slower speed than the output shaft 8 assuming some slippage in the clutch pack 26. Since the activation extension 32A is magnetically attracted toward the intermediate plate 34, the activation plate 32 will frictionally be slowed to the speed of the input shaft 6. This is permitted since the first one-way clutch 24 is unlocked which allows this activation plate 32 to rotate at a slower speed than the output shaft 8. In this manner the present invention provides for the rotation of the activation plate 32 relative to the control plate 20 in the same direction as the previous example which results in an increase in the axial separation distance 47 between the control plate 20 and the activation plate 32 and a corresponding increase in the clamping load on the clutch pack 26.

Thus the present invention provides for an increase in clutch pack 26 clamp load when the torque is flowing in either direction through the clutch assembly 4 using a unidirectional ball ramp mechanism 36. The utilization of the first one-way clutch 24 on the activation plate 32 and the second one-way clutch 46 on the coil armature 44 provides the operational feature of continuous loading of the clutch pack 26 in any type of operational mode when the coil 48 is energized. The use of the intermediate plate 34 increases the stability of the ball ramp mechanism 36 and in turn, improves the controlability of the clutch assembly 4.

Figure 5:
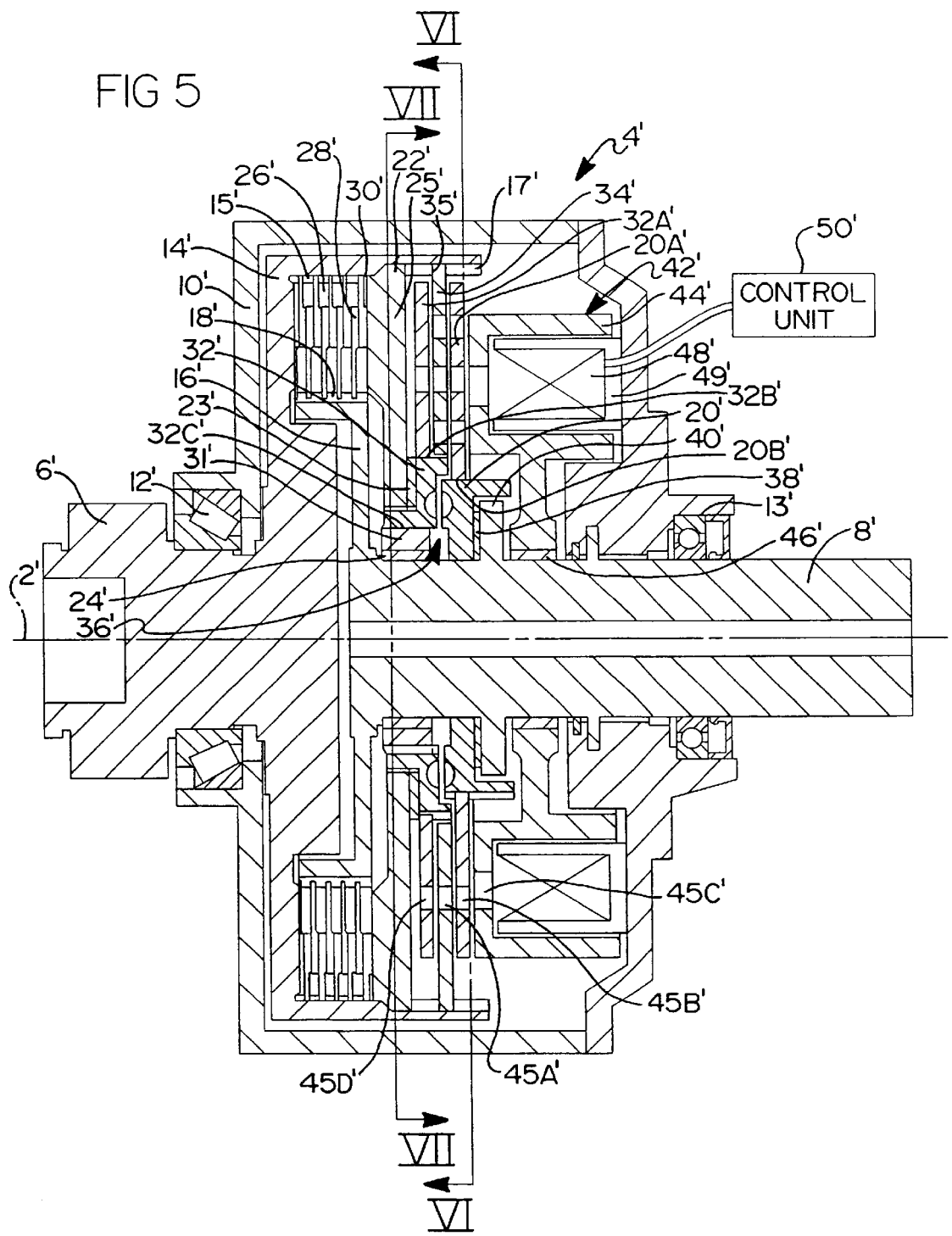
FIG. 5 is a cross-sectional view of a first alternative embodiment of the ball ramp clutch assembly of the present invention.

Now referring to FIG. 5, a cross-sectional view of a first alternate embodiment of the present invention is shown. An input shaft 6' is connected to a rotatable power source such as an internal combustion engine (not shown) and the clutch assembly 4' functions to rotationally link the input shaft 6' to output shaft 8' which, as an example, could be the input shaft to a transmission. The elements of the clutch assembly 4' generally rotate and are symmetrical around an axis of rotation 2'. A housing 10' is supported by the input shaft 6' through first bearing 12' and by the output shaft 8' through second bearing 13'. The input shaft 6' is attached to a clutch hub 14' which has a plurality of splines 15' on an inner surface of the clutch hub 14' and on the drive hub extension 17'. The output shaft 8' is attached to a hub 16' which has a plurality of splines 18' formed on the outside peripheral surface. The connotation of the terms "input shaft" and "output shaft" are interchangeable depending on the direction of torque flow through the clutch assembly 4'.

The ball ramp mechanism 36' is comprised of a control plate 20', the activation plate 32' and the rolling elements 39A', 39B', 39C' (see FIG. 2) which separate the control plate 20' and the activation plate 32' depending on their relative position in respective ramps 35A', 35B', 35C' and 37A', 37B', 37C'. As the activation plate 32' moves away from the control plate 20' it acts through thrust bearing 23' to apply a force on the pressure plate 25' so as to compress the clutch pack 26' to provide a frictional rotational link between the clutch hub 14' and the hub 16'. The clutch pack 26' is comprised of a plurality of drive plates 30' which are nonrotatably connected to the clutch hub 14' by splines 15' and a plurality of driven plates 28' which are nonrotatably connected to the hub 16' by splines 18' thereby allowing relative axial movement while rotating together. Again, the connotation of the terms "driven plates" and "drive plates" depends on the direction of the flow of torque through the driveline. If the engine is powering the vehicle, then the connotation of the terminology is traditional whereas when the vehicle is being braked by the engine, then the connotation must be reversed.

An intermediate plate 34' is rotatably connected to the clutch hub 14' through splined drive 35' as is the pressure plate 25' through splined drive 22'. The intermediate plate 34' extends to be positioned between the control extension 20A' and the activation extension 32A'. The control extension 20A' is coupled to the control plate 20' with a control slip joint 20B' and the activation extension 32A' is coupled to the activation plate 32' with an activation slip joint 32B'. The slip joints 20B' and 32B' of the control extension 20A' and the activation extension 32' allow the control plate 20' and the activation plate 32' to axially move while the control extension 20A', the intermediate plate 34' and the activation extension 32A' remain in frictional contact when the coil 48' is energized. The slip joint 20B' does not allow the control plate 20' to rotate relative to the control extension 20A' and likewise, the slip joint 32B' does not allow the activation plate 32' to rotate relative to the activation extension 32A'.

The control plate 20' is axially restrained by a thrust bearing 38' which reacts against a shaft flange 40' which is attached to the output shaft 8'. More specifically, the control plate 20' includes a control extension 20A' which radially extends and magnetically interacts with both the coil armature 44' and the intermediate plate 34'. The activation plate 32' includes an activation extension 32A' which radially extends and magnetically and frictionally interacts with the intermediate plate 34'. The intermediate plate 34' is disposed between the control extension 20A' and the activation extension 32A'. The control extension 20A', the intermediate plate 34' and the activation extension 32A' contact one another directly or a friction material can be applied to either or both of the surfaces of the control extension 20A', the intermediate plate 34' or the activation extension 32A'. Slots 45C', 45A' and 45B' are formed in the coil pole 44' intermediate plate 34' and the control extension 20A' respectively to provide a proper magnetic circuit.

The intermediate plate slots 45A', the control extension slots 45B', the armature slots 45C' and the activation extension slots 45D can be of any length, alignment and shape. The characterization of the slots 45A', 45B', 45C' and 45D' as "circumferential" means that the centerline of the slot lies generally along a circumferential line at some radius from the center of the particular element in which it is formed.

A first one-way clutch 24' is used to support the activation plate 32' on the output shaft 8'. The first one-way clutch 24' is oriented to lock the rotation of the activation plate 32' when the input shaft 6 is rotating in a direction such as when the engine is powering the vehicle and the driveline torque flows from the input shaft 6' to drive the output shaft 8'.

A second one-way clutch 46' is used to support the coil armature 44' on the output shaft 8'. The second one-way clutch 46' is oriented opposite to the first one-way clutch 24' to lock the rotation of the control plate 20' when the input shaft 6' is rotating in a direction such as when the engine is braking the vehicle and the torque flow through the driveline is reversed from that described supra.

A coil assembly 42' is electrically energized by a control unit 50' to produce an electromagnetic field to activate the ball ramp mechanism 36'. The coil assembly 42' is comprised of a coil 48' that is mounted to the housing 10'. The coil stator 49' is partially surrounded by a coil armature 44'. Both the coil stator 49' and the coil armature 44' are made of a ferro magnetic material to allow conduction of electromagnetic fields therein.

When the coil assembly 42' is energized, the control plate 20' through the control extension 20A', the intermediate plate 34' and the activation plate 32' through the activation extension 32A' are electromagnetically drawn together to become frictionally and thereby rotationally linked. Some slippage can occur depending on the axial loading, the coefficient of friction of the material and the torque transfer. This configuration in combination with the operation of the first and second one-way clutches 24' and 46' results in a ball ramp mechanism 36' having a higher level of damping for improved operation that will remain engaged even if the direction of torque transfer is reversed.

Thrust bearings 23' and 38' are strategically placed within the clutch assembly 4' to transfer the axial forces generated when the ball ramp mechanism 36' is energized. Thrust bearing 23' is located between the activation plate 32' and the pressure plate 25'. Thrust bearing 38' is located between the control plate 20' and the shaft flange 40'.

For purposes of increasing the movement of the actuation plate 32' to allow for increased separation of the clutch driven and drive plates 28', 30' and to also allow for sufficient clamping force to be generated on the clutch pack 26' upon activation of the ball ramp actuator 36' a plurality of axial slip joints 20B', 32B' and 32C' have been introduced at the control plate 20' and at the activation plate 32', respectively.

Figure 6:
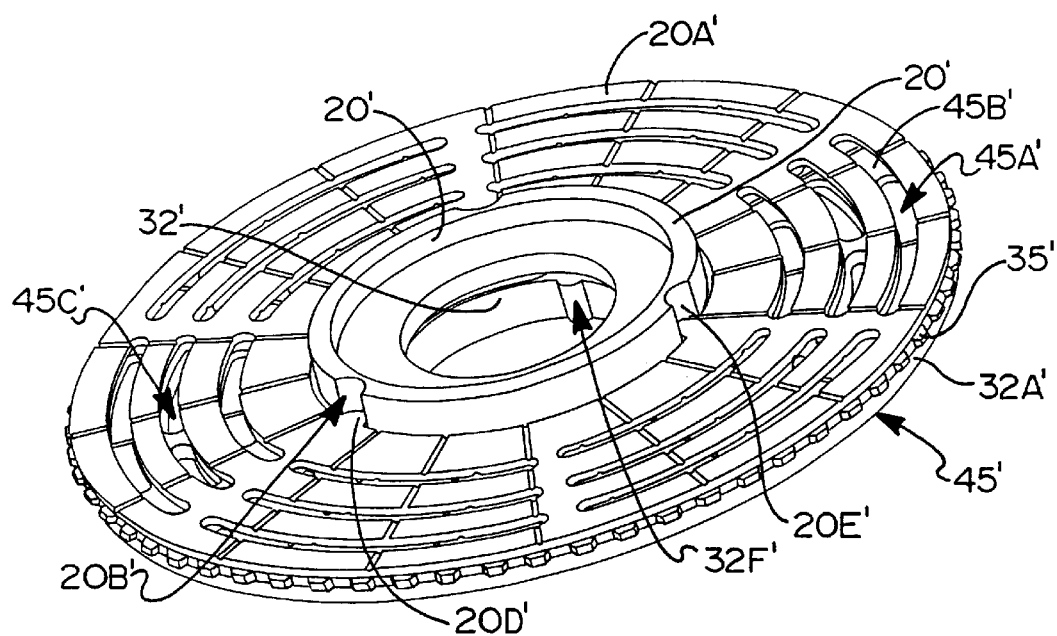
FIG. 6 is a perspective view of a portion of the clutch assembly of FIG. 5 taken along line VI—VI.

Now referring to FIG. 6 which is a perspective cross-sectional view of the first alternate embodiment as shown in FIG. 5 taken along line VI—VI, an example of such an axial slip joint 20B' is shown where control plate 20' is shown coupled to control extension 20A' by at least one slip joint 20B'. A plurality of drive pockets 20E' are formed on the control plate 20' into which a like number of mating drive tabs 20D' which are formed on the control extension 20A' engage to provide a nonrotatable type of coupling between the control plate 20' and the control extension 20A' while allowing relative axial motion. Thus, a slip joint 20B' consists of a tab 20D' which extends to fill the space created by a channel 20E'.

Figure 7:
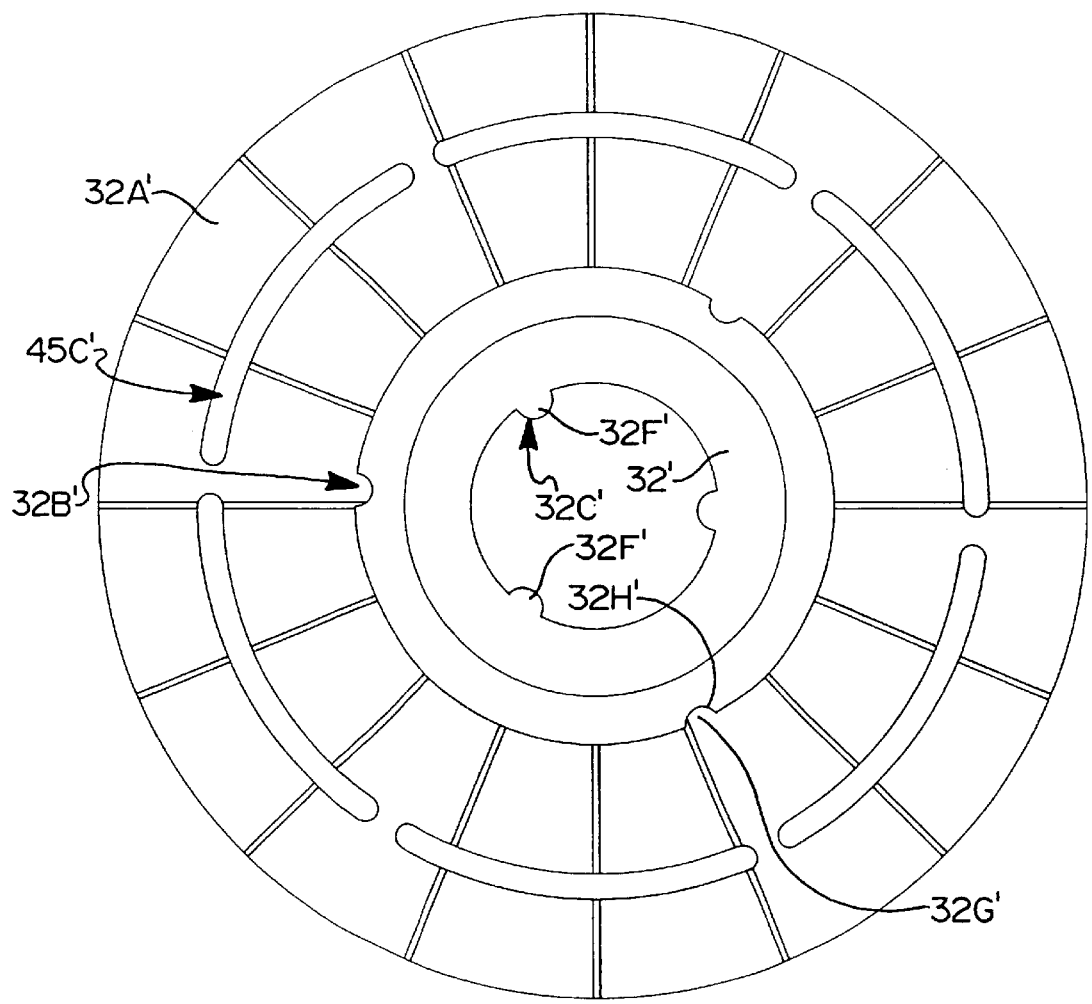
FIG. 7 is an elevated view of a portion of the clutch assembly of FIG. 5 taken along line VII—VII.

Now referring to FIG. 7 which is a cross-sectional view of the first alternate embodiment of the present invention as shown in FIG. 5 taken along line VII—VII, likewise, slip joint 32B' provides for a nonrotational type of linkage between the activation plate 32' and the activation extension 32A' while providing for axial movement therebetween. Forming the slip joint 32B' are drive tabs 32G' which extend from the activation extension 32A' which engage corresponding drive pockets 32H' formed in the activation plate 32'. Also a second slip joint 32C' is introduced between an activation spacer 31' and the activation plate 32' where the annular activation spacer 31' is attached to the first one-way clutch 24'. Drive tabs 32F' extend to engage corresponding drive pockets (not shown) formed in the activation spacer 31'.

Circumferential slots 45A', 45B', 45C' and 45D' are formed in the intermediate plate 34', the control extension 20A', the activation extension 32A' and the armature 44' respectively which serve to direct the flow of electromagnetic energy through these elements to attempt to maximize the rotational locking torque generated on the control plate 20' for a given level of electrical energy supplied to the coil 48'. FIGS. 6 and 7 show the slots 45A', 45B', 45C' and 45D' formed in the intermediate plate 34', the control extension 20A', the activation extension 32A' and the armature 44'.

Operation

Consider the situation when the torque flow is from the input shaft 6' to the output shaft 8' where both the input and output shafts 6', 8' are both rotating clockwise as viewed from the input shaft 6' and the coil assembly 42' is energized. This condition is analogous to a vehicle being powered by the engine where the clutch assembly 4' is functioning as a master clutch. The first one-way clutch 24' becomes locked and the second one-way clutch 46' becomes unlocked to allow relative rotation between the control plate 20' and the activation plate 32' in a direction to further expand the ball ramp mechanism 36'. The control plate 20' is frictionally connected to the coil armature 44' through the control extension 20A' which is allowed to rotate at or slower relative to the output shaft 8' by the one-way clutch 46' which is unlocked (i.e. the input shaft 6' and output shaft 8' are rotating clockwise while the coil armature 44' is free to rotate relative to the output shaft 8' in a counterclockwise direction). Thus, the coil armature 44' can rotate at or slower than the speed of the output shaft 8'.

The intermediate plate 34' is rotating with the input shaft 6' while the activation plate 32' is locked by the first one-way clutch 24' to rotate with the output shaft 8'. If there is slippage occurring in the clutch pack 26', then the input shaft 6' will be rotating at a slightly higher speed than the output shaft 8'. Thus, the intermediate plate 34' will be rotating faster than the output shaft 8' but the control plate 20' cannot rotate faster than the output shaft 8' because it is magnetically/frictionally coupled to the coil armature 44' through the control extension 20A' which is only allowed to rotated at the speed of the output shaft 8' or slower. The intermediate plate 34' is also frictionally coupled to the activation plate 32' through the activation extension 32A' which is allowed to rotate at or faster than the output shaft 8' because the first one-way clutch 24' is locked. Thus, if there is slippage in the clutch pack 26' then the input shaft 6' is rotating faster than the output shaft 8' and the activation plate 32' will rotate faster than the control plate 20' (at least for a short time) which will further activate the ball ramp mechanism 36' and increase the separation distance 47' between the control plate 20' and the activation plate 32'. The increased separation will increase the clamp load on the clutch pack 26' by axial movement of the pressure plate 25'. This will in turn reduce the amount of slippage in the clutch pack 26' and improve rotational coupling between the input shaft 6' and the output shaft 8'.

Now consider the situation when the torque flow is reversed from the preceding example and the output shaft 8' is attempting to rotate faster than the input shaft 6' when the clutch assembly 4' is functioning as a master clutch, this situation is analogous to a vehicle which is under engine braking. Both the input shaft 6' and the out put shaft 8' are still rotating clockwise and the coil assembly 42' is energized. The first one-way clutch 24' becomes unlocked and the second one-way clutch 46' becomes locked to allow relative rotation between the control plate 20' and the activation plate 32' in a direction to farther expand the ball ramp mechanism 36'. When the coil 48' is electrically energized the control plate 20' is frictionally connected to the coil armature 44' through the control extension 20A' which is rotationally connected to the output shaft 8' by the locked second one-way clutch 46'. Thus, the coil armature 44' and the control plate 20' will rotate at least as for as the output shaft 8'. The intermediate plate 34' is rotating with the input shaft 6' which is rotating at a slightly slower speed than the output shaft 8' assuming some slippage in the clutch pack 26'. Since the activation extension 32A' is magnetically attracted toward the intermediate plate 34', the activation plate 32' will frictionally be slowed to the speed of the input shaft 6'. This is permitted since the first one-way clutch 24' is unlocked which allows this activation plate 32' to rotate at a slower speed than the output shaft 8'. In this manner the present invention provides for the rotation of the activation plate 32' relative to the control plate 20' in the same direction as the previous example which results in an increase in the axial separation distance 47' between the control plate 20' and the activation plate 32' and a corresponding increase in the clamping load on the clutch pack 26'.

Thus the present invention provides for an increase in clutch pack 26' clamp load when the torque is flowing in either direction through the clutch assembly 4' using a unidirectional ball ramp mechanism 36'. The utilization of the first one-way clutch 24' on the activation plate 32' and the second one-way clutch 46' on the coil armature 44' provides the operational feature of continuous loading of the clutch pack 26' in any type of operational mode when the coil 48 is energized. The use of the intermediate plate 34' increases the stability of the ball ramp mechanism 36' and in turn, improves the controllability of the clutch assembly 4'.

Figure 8:
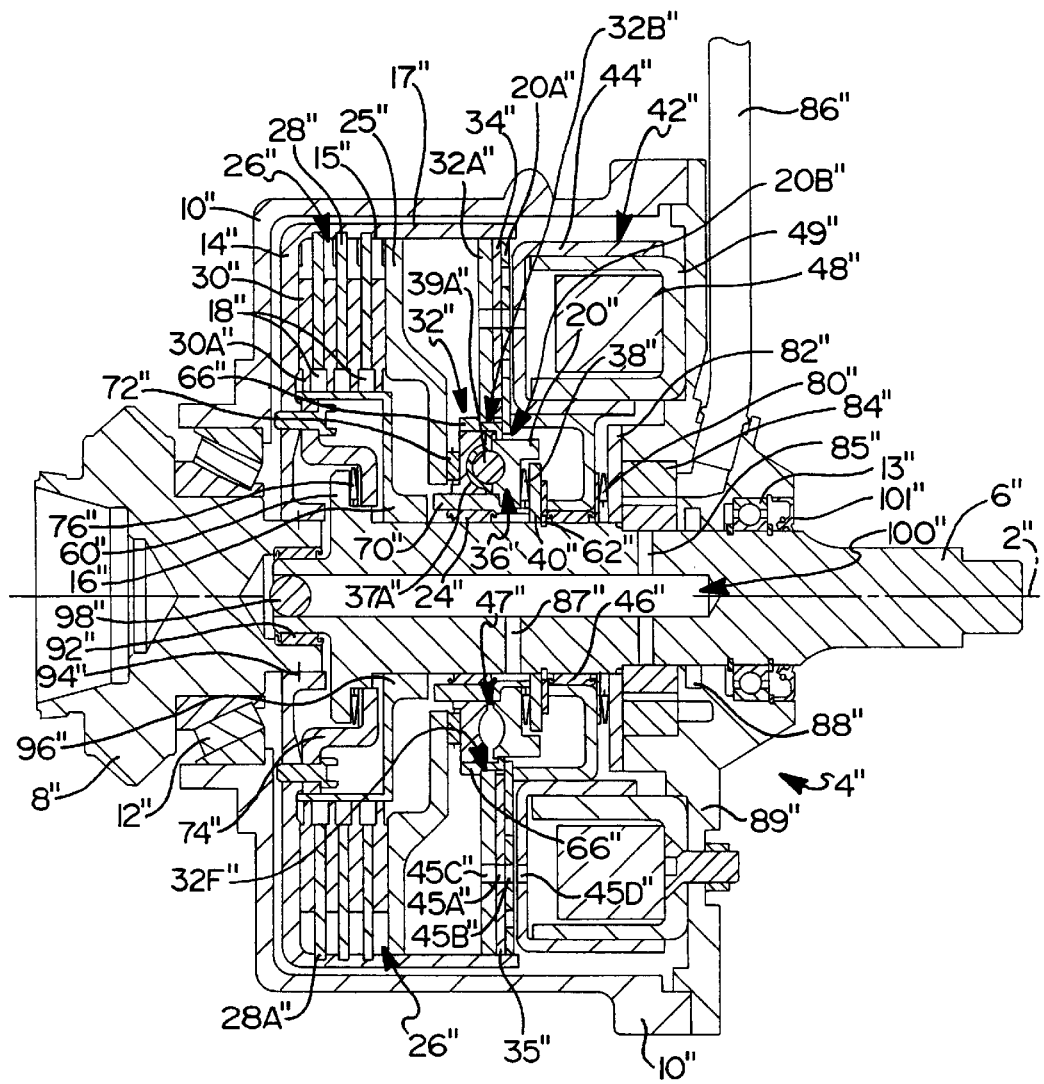
FIG. 8 is a cross-sectional view of a second alternate embodiment of the ball ramp clutch assembly of the present invention.
Figure 9:
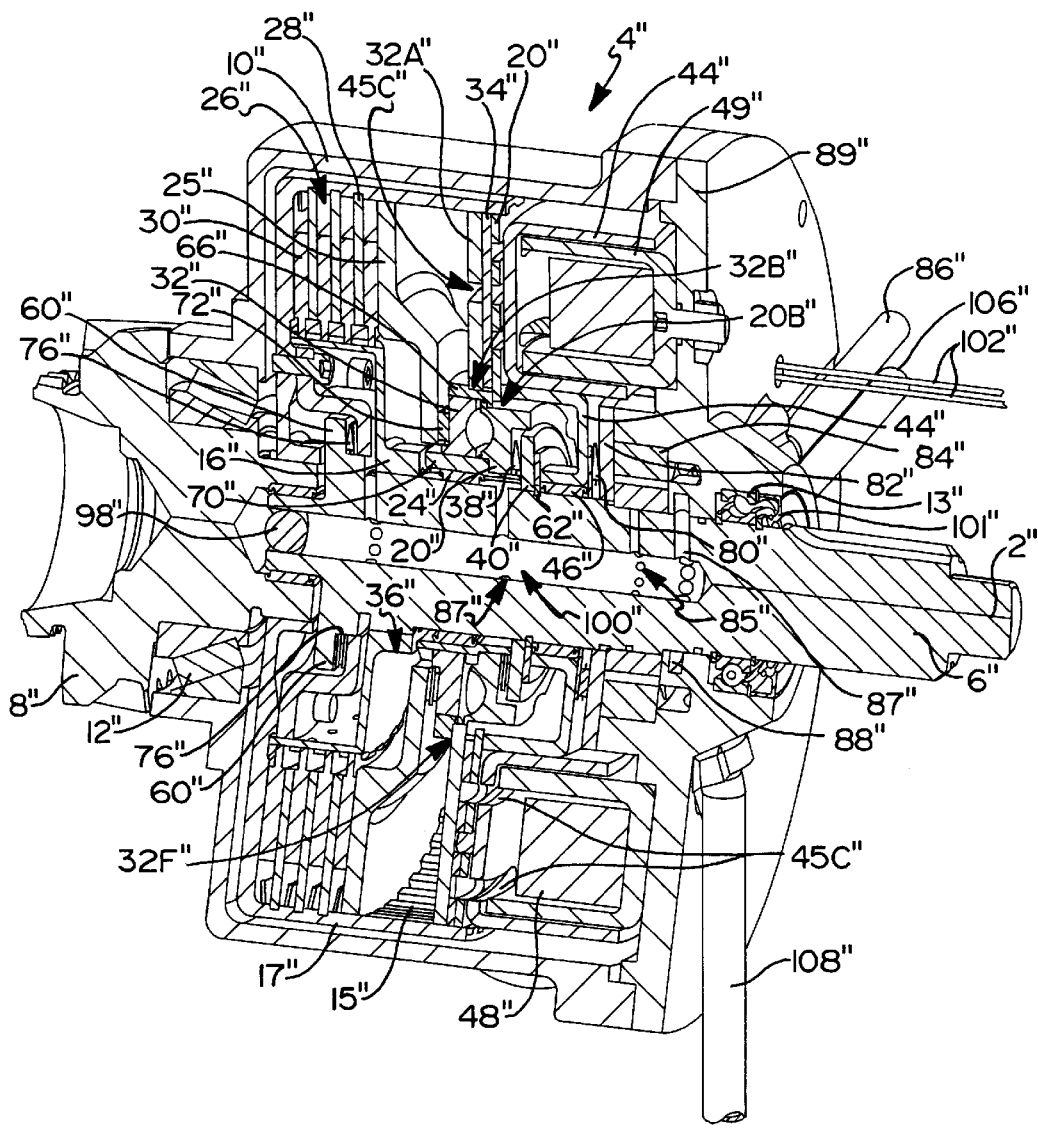
FIG. 9 is a perspective cross-sectional view of a portion of the clutch assembly of FIG. 8.

Now referring to FIGS. 8 and 9, a cross-sectional view and a perspective view of a second alternate embodiment of the clutch assembly 4" of the present invention are shown. An input shaft 6" is connected to a rotatable power source such as an internal combustion engine (not shown) and the clutch assembly 4" functions to rotationally link the input shaft 6" to output shaft 8" which, as an example, could be the input shaft to a transmission. Note that the input shaft 6" is for purposes of describing this embodiment shown on the right side. The elements of the clutch assembly 4" generally rotate and are symmetrical around an axis of rotation 2". A housing 10" is supported by the input shaft 6" through second bearing 13" and by the output shaft 8" through first bearing 12". The output shaft 8" is attached to a clutch hub 14" which has a plurality of splines 15" on an inner surface of the clutch hub 14" and on the drive hub extension 17". The input shaft 6" is attached to a hub 16" which has a plurality of splines 18" formed on the outside peripheral surface. The connotation of the terms "input shaft" and "output shaft" are interchangeable depending on the direction of torque flow through the clutch assembly 4".

The ball ramp mechanism 36" is comprised of a control plate 20", the activation plate 32" and the rolling elements 39A", 39B", 39C" (see FIG. 2) which separate the control plate 20" and the activation plate 32" depending on their relative position in respective ramps 35A", 35B", 35C" and 37A", 37B", 37C". As the activation plate 32" moves away from the control plate 20" it acts through thrust bearing 72" to apply a force on the pressure plate 25" so as to compress the clutch pack 26" to provide a frictional rotational link between the clutch hub 14" and the hub 16". The clutch pack 26" is comprised of a plurality of drive plates 30" which are nonrotatably connected to the hub 16" by splines 18" and a plurality of driven plates 28" which are nonrotationally connected to the clutch hub 14" by splines 15" thereby allowing relative axial movement while rotating together. Again, the connotation of the terms "driven plates" and "drive plates" depends on the direction of the flow of torque through the driveline. If the engine is powering the vehicle, then the connotation of the terminology is traditional whereas when the vehicle is being braked by the engine, then the connotation must be reversed.

An intermediate plate 34" is rotatably connected to the clutch hub 14" through splined drive 35" as is the pressure plate 25" through splined drive 22. The intermediate plate 34" extends to be positioned between the control extension 20A" and the activation extension 32A". The control extension 20A" is coupled to the control plate 20" with a control slip joint 20B" and the activation extension 32A" is coupled to the activation plate 32" with an activation slip joint 32B". The slip joints 20B" and 32B" of the control extension 20A" and the activation extension 32A" allow the control plate 20" and the activation plate 32" to move while the control extension 20A", the intermediate plate 34" and the activation extension 32A" remain in contact. The control plate 20" is axially restrained by a thrust bearing 38" which reacts against a shaft flange 40" which is attached to the output shaft 8". More specifically, the control plate 20" includes a control extension 20A" which radially extends and magnetically interacts with both the coil armature 44" and the intermediate plate 34". The activation plate 32" includes an activation extension 32A" which radially extends and magnetically and frictionally interacts with the intermediate plate 34". The intermediate plate 34" is disposed between the control extension 20A" and the activation extension 32A". The control extension 20A", the intermediate plate 34" and the activation extension 32A" contact one another directly or a friction material can be attached to either or both of the surfaces of the control extension 20A", the intermediate plate 34" or the activation extension 32A". Slots 45C", 45A" and 45B" are formed in the coil pole 44" intermediate plate 34" and the control extension 20A" respectively to provide a proper magnetic circuit.

A first one-way clutch 24" is used to support the activation plate 32" on the output shaft 8". The first one-way clutch 24" is oriented to lock the rotation of the activation plate 32" when the input shaft 6" is rotating in a direction such as when the engine is powering the vehicle and the driveline torque flows from the input shaft 6" to drive the output shaft 8".

A second one-way clutch 46" is used to support the coil armature 44" on the output shaft 8". The second one-way clutch 46" is oriented opposite to the first one-way clutch 24" to lock the rotation of the control plate 20" when the input shaft 6" is rotating in a direction such as when the engine is braking the vehicle and the torque flow through the driveline is reversed from that described supra.

A coil assembly 42" is electrically energized by a control unit 50" through signal wires 102" to produce an electromagnetic field to activate the ball ramp mechanism 36". The coil assembly 42" is comprised of a coil 48" that is mounted to the housing 10". The coil stator 49" is partially surrounded by a coil armature 44". Both the coil stator 49" and the coil armature 44" are made of a ferro magnetic material to allow conduction of electromagnetic fields therein.

When the coil assembly 42" is energized, the control plate 20" through the control extension 20A", the intermediate plate 34" and the activation plate 32" through the activation extension 32A" are electromagnetically drawn together to become frictionally and thereby rotationally linked. Some slippage can occur depending on the axial loading, the coefficient of friction of the material and the torque transfer. This configuration in combination with the operation of the first and second one-way clutches 24" and 46" results in a ball ramp mechanism 36" having a higher level of damping for improved operation that will remain engaged even if the direction of torque transfer is reversed.

The pressure plate 25" is shaped to engage the drive hub extension 17" by the splined drive 22". In a like manner, the intermediate plate 34" is shaped to engage the drive hub extension 17" by the splined drive 35". By using splined drives 22" and 35", the pressure plate 25" and the intermediate plate 34" are nonrotationally coupled so as to rotate with the clutch hub 14" while axial movement is allowed as required.

Identical to and as more clearly illustrated in FIG. 2 are the control ramps 35A", 35B", 35C" (see 35A, 35B and 35C) formed in the control plate 20" and the activation ramps 37A", 37B", 37C" formed in the activation plate 32". The control ramps 35A", 35B", 35C" at least partially oppose the activation ramps 37A", 37B", 37C" and both are of variable depth increasing from one end to the other. Rolling elements 39A", 39B", 39C" simultaneously contact and roll along respective opposed control ramps 35A", 35B", 35C" and activation ramps 37A", 37B", 37C". The rolling elements 39A", 39B", 39C" are shown in a nonactivated position where each contacts a respective control and activation ramp 35A", 35B", 35C"; 37A", 37B", 37C" at their lowest depth thereby minimizing the separation distance 47" (see FIG. 3). As the ball ramp mechanism 36" is activated by electronically energizing the coil 48", assuming there exists slippage in the clutch pack 26", the control plate 20" moves counterclockwise relative to the activation plate 32" thereby causing the rolling elements 39A", 39B", 39C" to transverse the three respective pairs of opposed variable depth control ramps 35A", 35B", 35C" and activation ramps 37A", 37B", 37C". As the control plate 20" continues to rotate relative to the activation plate 32", the separation distance 47" increases thereby increasing the clamp force on the clutch pack 26".

Again referring to FIGS. 8 and 9 of the drawings, the input shaft 6" rotates about the axis of rotation 2" and is typically nonrotatably connected to a prime mover such as an internal combustion engine (not shown). The housing 10" of the clutch assembly 4" is rotatably supported on front bearing 12" which is mounted on input shaft 6" and by rear bearing 13" which is mounted on the output shaft 8" which rotates on the axis of rotation 3". The output shaft 8" is nonrotatably connected to the clutch hub 14" which includes splines 15" extending from the inner surface thereof to nonrotatably engage the drive plates 28". A hub 16" is non-rotatably attached to the input shaft 6" and hence generally rotates relative to the clutch hub 14" unless the clutch assembly 4" is engaged without slippage. The drive hub extension 17" is part of the clutch hub 14" and splines 15" extend to nonrotatably engage the intermediate plate 34". A plurality of drive plates 30" which are nonrotatably connected to the hub 16" are frictionally rotationally coupled to a plurality of driven plates 28" when the ball ramp mechanism 36" of the present invention is energized by electrically energizing the coil 48". When electrically energized, a electromagnetic field is generated which flows through the stator 49" and the armature 44". The stator 49" and the coil 48" are mounted to the housing 10".

The embodiment shown in FIG. 8 does not load the housing 10" since the clutch clamping force is contained between flange 60" and thrust bearing 76" acting on the drive flange 74" which is part of the clutch hub 14" and on the opposite side of the clutch pack 26", the thrust bearing 38" acting against the shaft flange 40" which is axially supported on the input shaft 6" by retaining ring 62".

The activation extension 32A" is linked to the control plate 20" using an axial gap sleeve 66" so that the two elements can freely move rotationally but are limited in their relative axial separation. The gap sleeve 66" functions to limit the separation between the activation extension 32A", the intermediate plate 34" and the control extension 20A" so that these elements do not abruptly engage the ball ramp mechanism 36" when the coil assembly 42" is electrically energized. The activation plate 32" slideably engages the gap sleeve 66" which regulates the maximum gap allowable between the control plate 20", the intermediate plate 34" and the activation plate 32" to prevent excess axial travel of those elements when the ball ramp mechanism 19" moves axially. Gap sleeve 66" contacts the activation plate 32" and is rotationally coupled to the activation plate 32" by a slip joint 32F" where the activation plate 32" is connected to the activation sleeve 70" which is supported on one-way clutch 24". Gap sleeve 66" allows the activation plate 32" to move axially when the one-way clutch 24" is locked relative to the input shaft 6".

Intermediate plate 34" slideably engages the drive hub extension 17" through outside diameter splines which permit axial motion between the intermediate plate 34" and the drive hub extension 17" while rotatably linking the two elements.

Roller thrust bearing 72" separates the activation plate 32" and the pressure plate 25" which allows both the activation plate 32" and the pressure plate 25" to rotate independently. Pressure plate 25" axially loads the clutch pack 26" when the ball ramp mechanism 19" is energized. Clutch pack 26" pushes against the clutch hub 14" which is retained by coupling 74" to translate the axial force to a thrust bearing 76" and onto the flange 60". In this manner, all of the clutch pack 26" clamping loads are contained and not transferred to the housing 10". The control extension 20A" is nonrotationally slideably connected to the control plate 20" through a control slip joint 32B". Thrust bearing 80" is placed between the armature 44" and a pump cover 82" which serves to provide axial support to the armature 44" to the housing 10". The front cover 89" is connected to housing 10".

Transmission front ball bearing 12" and the rear bearing 13" basically support the clutch assembly 4". Support bearing 92" contacts the output shaft 8" and the input shaft 6" further supplying support to the clutch assembly 4" while allowing relative rotation between the input shaft 6" and the output shaft 8". Seal 101" prevents the leakage of oil from the housing 10".

Splines 94" function to nonrotatably link the clutch hub 14" to the output shaft 8" thereby facilitating the assembly of the clutch assembly 4" components. Splines 94" are used to nonrotatably couple the input shaft 6" to the hub 16". Splines 94" and splines 96" combine to provide a torque path from the input shaft 6" through the clutch pack 26" and into the output shaft 8". Thus, the normal driving torque flow through the clutch assembly 4" when the coil assembly 42" is electrically powered and the ball ramp mechanism 36" is energized, is from the input shaft 6" through splines 96" to the hub 16" into the clutch pack 26" and then into the clutch hub 14" and through splines 94" into the output shaft 8" for transmittal to another device such as a vehicle transmission. The torque flow through the clutch assembly 4" is reversed when in a driven mode where essentially the input shat 6" acts as an output shaft and the output shaft 8" acts as an input shaft.

Oil pump 84" functions to provide a pressurized flow of oil through the rotating clutch pack 26" and generally, the ball ramp mechanism 36" to provide both a source of cooling and lubrication. Oil return line 86" supplies a flow of oil from a heat exchanger (not shown) to the pump 84" which pumps oil through the interior of the clutch housing 10" and the oil is then drained through a separate oil sump line 108" (see FIG. 10). The oil flows to the clutch assembly 4" through oil supply aperture 85" and flows into the inner cavity 100" of the input shaft 6" for distribution to the clutch pack 26" through various oil apertures such as, for example, oil aperture 87" which is illustrative of this well known method to adequately distribute the flow of lubricant (most oil apertures are not shown in FIG. 8 for sake of clarity). The plug 98" is used to contain the flow of cooling/lubricating oil that is force fed by pump 84" through the shaft cavity 100 from an external oil supply to the clutch assembly 4". The oil sump line 108" extends into an oil supply reservoir such as that of a transmission (not shown) and the oil is drawn up into the oil pump 84" where it is pumped to the heat exchanger through oil pump line 106" and flows through the heat exchanger and returns to the clutch assembly 4" through the oil return line 86".

Again referring to FIG. 10 of the drawings, a perspective view of the second alternate embodiment of the clutch assembly 4" of the present invention is shown. The front cover 89" of the clutch assembly 4" is partially cut away to more clearly shown the oil pump 84" which pumps oil from an oil sump through oil sump line 108" to an oil heat exchanger (not shown) through oil pump line 106" which when cooled, is returned to the clutch assembly 4" through the oil return line 104". The input shaft 6" includes a plurality of oil flow apertures that distribute the cooling/lubricating oil to various sections of the clutch assembly 4". The gerotor style of oil pump 84" and the signal wires 102" which are connected to the control unit 50 (see FIG. 1). The oil pump 84" pumps the lubricating oil through at least one oil supply aperture 85" into the shaft cavity 100" for distribution through a plurality of oil distribution apertures 87".

Operation

Consider the situation when the torque flow is from the input shaft 6" to the output shaft 8" where both the input and output shafts 6", 8" are both rotating clockwise as viewed from the input shaft 6" and the coil assembly 42" is energized. This condition is analogous to a vehicle being powered by the engine where the clutch assembly 4" is functioning as a master clutch. The first one-way clutch 24" becomes locked and the second one-way clutch 46" becomes unlocked to allow relative rotation between the control plate 20" and the activation plate 32" in a direction to further expand the ball ramp mechanism 36". The control plate 20" is frictionally connected to the coil armature 44" through the control extension 20A" which is allowed to rotate at or slower relative to the output shaft 8" by the one-way clutch 46" which is unlocked (i.e. the input shaft 6" and output shaft 8" are rotating clockwise while the coil armature 44" is free to rotate relative to the output shaft 8" in a counter-clockwise direction). Thus, the coil armature 44" can rotate at or slower than the speed of the output shaft 8".

The intermediate plate 34" is rotating with the input shaft 6" while the activation plate 32" is locked by the first one-way clutch 24" to rotate with the output shaft 8". If there is slippage occurring in the clutch pack 26", then the input shaft 6" will be rotating at a slightly higher speed than the output shaft 8". Thus, the intermediate plate 34" will be rotating faster than the output shaft 8" but the control plate 20" cannot rotate faster than the output shaft 8" because it is magnetically/frictionally coupled to the coil armature 44" through the control extension 20A" which is only allowed to rotated at the speed of the output shaft 8" or slower. The intermediate plate 34" is also frictionally coupled to the activation plate 32" through the activation extension 32A" which is allowed to rotate at or faster than the output shaft 8" because the first one-way clutch 24" is locked. Thus, if there is slippage in the clutch pack 26" then the input shaft 6" is rotating faster than the output shaft 8" and the activation plate 32" will rotate faster than the control plate 20" (at least for a short time) which will further activate the ball ramp mechanism 36" and increase the separation distance 47" between the control plate 20" and the activation plate 32". The increased separation will increase the clamp load on the clutch pack 26" by axial movement of the pressure plate 25". This will in turn reduce the amount of slippage in the clutch pack 26" and improve rotational coupling between the input shaft 6" and the output shaft 8".

Now consider the situation when the torque flow is reversed from the preceding example and the output shaft 8" is attempting to rotate faster than the input shaft 6". When the clutch assembly 4" is functioning as a master clutch, this situation is analogous to a vehicle which is under engine braking. Both the input shaft 6" and the out put shaft 8 are still rotating clockwise and the coil assembly 42" is energized. The first one-way clutch 24" becomes unlocked and the second one-way clutch 46" becomes locked to allow relative rotation between the control plate 20" and the activation plate 32" in a direction to farther expand the ball ramp mechanism 36". When the coil 48" is electrically energized, the control plate 20" is frictionally connected to the coil armature 44" through the control extension 20A" which is rotationally connected to the output shaft 8" by the locked second one-way clutch 46". Thus, the coil armature 44" and the control plate 20" will rotate at least as for as the output shaft 8". The intermediate plate 34" is rotating with the input shaft 6" which is rotating at a slightly slower speed than the output shaft 8" assuming some slippage in the clutch pack 26". Since the activation extension 32A" is magnetically attracted toward the intermediate plate 34", the activation plate 32" will frictionally be slowed to the speed of the input shaft 6". This is permitted since the first one-way clutch 24" is unlocked which allows this activation plate 32" to rotate at a slower speed than the output shaft 8". In this manner the present invention provides for the rotation of the activation plate 32" relative to the control plate 20" in the same direction as the previous example which results in an increase in the axial separation distance 47" between the control plate 20" and the activation plate 32" and a corresponding increase in the clamping load on the clutch pack 26".

Thus the present invention provides for an increase in clutch pack 26" clamp load when the torque is flowing in either direction through the clutch assembly 4" using a unidirectional ball ramp mechanism 36". The utilization of the first one-way clutch 24" on the activation plate 32" and the second one-way clutch 46" on the coil armature 44" provides the operational feature of continuous loading of the clutch pack 26" in any type of operational mode when the coil 48" is energized. The use of the intermediate plate 34" increases the stability of the ball ramp mechanism 36" and in turn, improves the controlability of the clutch assembly 4".

Figure 10:
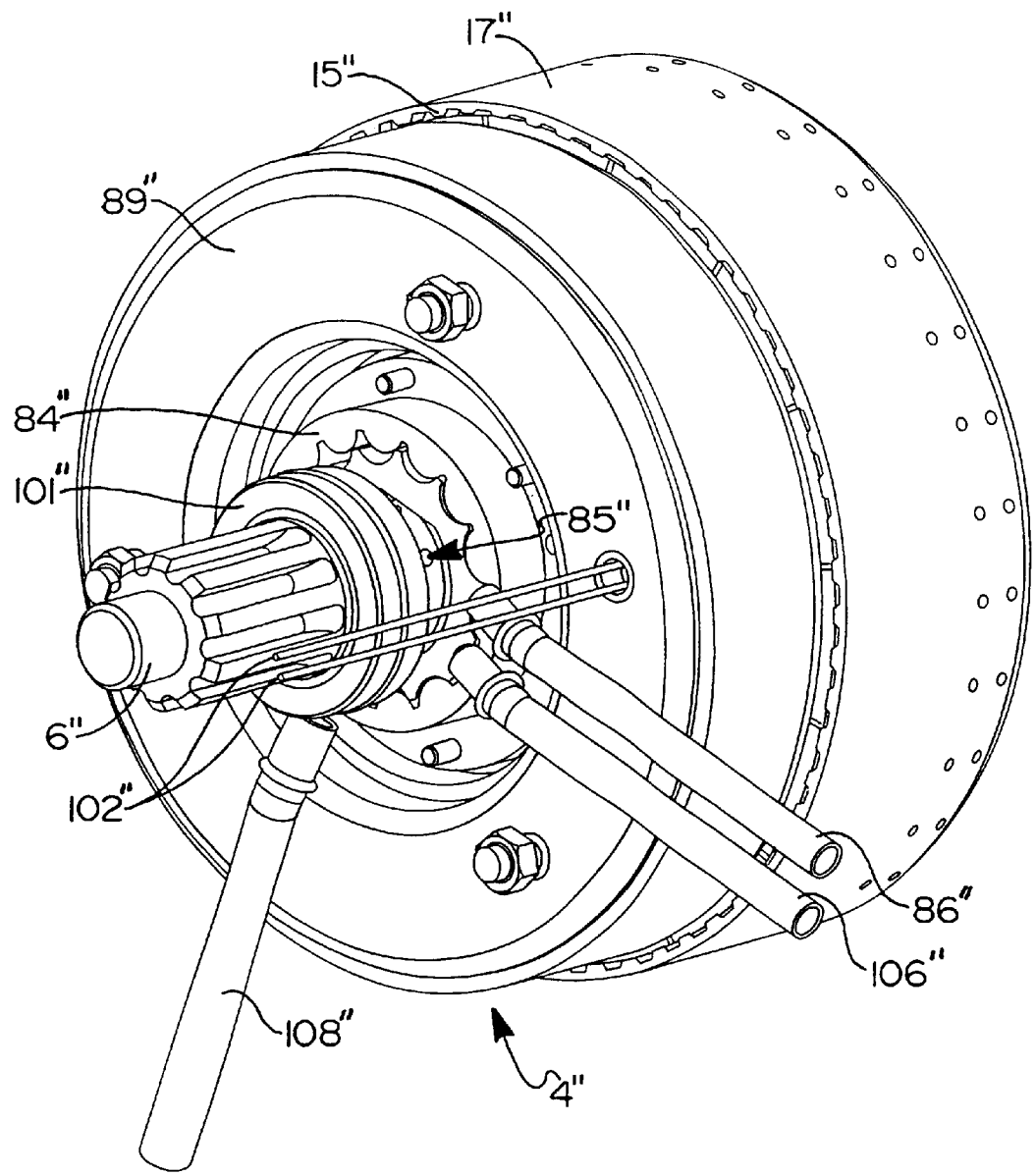
FIG. 10 is a perspective view of the clutch assembly of FIG. 8.

In all three embodiments shown in this application, common reference numbers, disregarding the prime or double print designations, function in generally the same manner and descriptions of one embodiment can be read to apply to the other embodiments equally except for the direction of torque flow through the second embodiment in FIGS. 8–10 which changes some of the element designations and functions. For example, the input shaft 6" could be any type of rotational input member connected so as to rotate the one-way clutches 24" and 46" and the hub 16". Also, the output shaft 8" could be any type of suitable rotational output member connected to rotate with the clutch hub 14".

Although this invention has been described in its preferred form with a certain degree of particularity, it is understood that the present disclosure of the preferred form has been made only by way of example in that numerous changes in the details and construction and combination and arrangement of parts may be resorted to without departing from the spirit and the scope of the invention as now claimed.

What is claimed is:

1. A clutch assembly for rotationally coupling two rotatable shafts comprising:
   an input shaft rotating about an axis of rotation;
   an output shaft having an axis of rotation;
   a ball ramp mechanism for generating a clamping force comprising; an annular control plate having an axis of rotation, said control plate having a plurality of circumferential control ramps formed in a face of said control plate, said control ramps varying in axial depth, an equivalent number of rolling elements one occupying each of said control ramps, an activation plate mounted to said output shaft through a first one-way clutch having an axis of rotation coaxial with said axis of rotation of said control plate, said activation plate having a plurality of activation ramps substantially identical in number, shape and radial position to said control ramps where said activation ramps at least partially oppose said control ramps and where each of said rolling elements is contained between one of said activation ramps and a respective control ramp, said control plate being axially and rotationally moveably disposed relative to said activation plate, said control plate having an annular control extension radially extending therefrom and said activation plate having an annular activation extension radially extending therefrom;
   an annular intermediate plate nonrotatably connected to said input shaft and disposed between said control extension and said activation extension;
   a coil for creating of an electromagnetic field in a coil pole upon introduction of an electrical current in said coil where said coil pole is mounted to said output shaft through a second one-way clutch;
   a clutch pack for frictionally rotatably connecting said input shaft to said output shaft upon application of said clamp load generated by said ball ramp mechanism;
   where upon introduction of an electrical current in said coil an electromagnetic field is generated to rotationally couple said coil pole to said control extension and said control extension to said intermediate plate and said intermediate plate to said activation extension.

2. The clutch assembly of claim 1, further comprising a plurality of circumferentially extending slots formed in said intermediate plate.

3. The clutch assembly of claim 1, further comprising a plurality of circumferentially extending slots formed in said control extension.

4. The clutch assembly of claim 1, further comprising a plurality of circumferentially extending slots formed in said activation extension.

5. The clutch assembly of claim 1, further comprising a plurality of circumferentially extending slots formed in said coil armature.

6. The clutch assembly of claim 1, further comprising a plurality of circumferentially extending slots formed in said coil armature and in said control extension and in said intermediate plate and in said activation extension.

7. The clutch assembly of claim 6, wherein said slots are in substantiated alignment at a specific rotational position.

8. The clutch assembly of claim 1, further comprising at least one slip joint interposed between said control plate and said control extension to nonrotatably couple said control plate to said control extension while allowing relative axial movement between said control plate and said control extension.

9. The clutch assembly of claim 1, further comprising at least one slip joint interposed between said activation plate and said activation extension to nonrotatably couple said activation plate to said activation extension while allowing relative axial movement between said control plate and said control extension.

10. The clutch assembly of claim 1, further comprising an activation sleeve interposed between said activation plate and said first one-way clutch.

11. The clutch assembly of claim 10, further comprising at least one slip joint interposed between the activation plate and an outer surface of said activation sleeve where an inside surface of said activation sleeve is mounted on said first one-way clutch.

12. The clutch assembly of claim 1, further comprising a gap sleeve contacting said activation extension and said control plate thereby limiting the separation distance between the said activation extension, said intermediate plate, said control plate and said coil armature.

13. The clutch assembly of claim 1, further comprising a hub nonrotatably connected to said clutch pack and to said input shaft.

14. The clutch assembly of claim 13, further comprising a first thrust bearing interposed between said hub and said output shaft and a second thrust bearing interposed between said control plate and said output shaft.

15. The clutch assembly of claim 1, further comprising an oil pump rotatably driven by said output shaft thereby forcing an oil through said clutch assembly.

16. The clutch assembly of claim 15, further comprising a plurality of oil distribution apertures connected to a shaft cavity where said oil pump forces oil into said shaft cavity and into said oil distribution apertures.

17. A clutch assembly for rotationally coupling two rotatable shafts comprising:
   an input shaft rotating about an axis of rotation;
   an output shaft having an axis of rotation;
   a ball ramp mechanism for generating a clamping force comprising; an annular control plate having an axis of rotation, said control plate having a plurality of circumferential control ramps formed in a face of said control plate, said control ramps varying in axial depth, an equivalent number of rolling elements one occupying each of said control ramps, an activation plate mounted to said input shaft through a first one-way clutch having an axis of rotation coaxial with said axis of rotation of said control plate, said activation plate having a plurality of activation ramps substantially identical in number, shape and radial position to said control ramps where said activation ramps at least partially oppose said control ramps and where each of said rolling elements is contained between one of said activation ramps and a respective control ramp, said control plate being axially and rotationally moveably disposed relative to said activation plate, said control plate having an annular control extension radially extending therefrom and said activation plate having an annular activation extension radially extending therefrom;
   an annular intermediate plate nonrotatably connected to said output shaft and disposed between said control extension and said activation extension;
   a coil for creating of an electromagnetic field in a coil pole upon introduction of an electrical current in said coil where said coil pole is mounted to said input shaft through a second one-way clutch;

a clutch pack for frictionally rotatably connecting said output shaft to said input shaft upon application of said clamp load generated by said ball ramp mechanism;

where upon introduction of an electrical current in said coil an electromagnetic field is generated to rotationally couple said coil pole to said control extension and said control extension to said intermediate plate and said intermediate plate to said activation extension.

18. The clutch assembly of claim 17, further comprising a plurality of circumferentially extending slots formed in said intermediate plate.

19. The clutch assembly of claim 17, further comprising a plurality of circumferentially extending slots formed in said control extension.

20. The clutch assembly of claim 17, further comprising a plurality of circumferentially extending slots formed in said activation extension.

21. The clutch assembly of claim 17, further comprising a plurality of circumferentially extending slots formed in said coil armature.

22. The clutch assembly of claim 17, further comprising a plurality of circumferentially extending slots formed in said coil armature and in said control extension and in said intermediate plate and in said activation extension.

23. The clutch assembly of claim 22, wherein said slots are in substantiated axial alignment at a specific rotational position.

24. The clutch assembly of claim 17, further comprising at least one slip joint interposed between said control plate and said control extension to nonrotatably couple said control plate to said control extension while allowing relative axial movement between said control plate and said control extension.

25. The clutch assembly of claim 17, further comprising at least one slip joint interposed between said activation plate and said activation extension to nonrotatably couple said activation plate to said activation extension while allowing relative axial movement between said control plate and said control extension.

26. The clutch assembly of claim 17, further comprising an activation sleeve interposed between said activation plate and said first one-way clutch.

27. The clutch assembly of claim 26, further comprising at least one slip joint interposed between the activation plate and an outer surface of said activation sleeve where an inside surface of said activation sleeve is mounted on said first one-way clutch.

28. The clutch assembly of claim 17, further comprising a gap sleeve contacting said activation extension and said control plate thereby limiting the separation distance between the said activation extension, said intermediate plate, said control plate and said coil armature.

29. The clutch assembly of claim 17, further comprising a drive hub nonrotatably connected to said clutch pack and to said input shaft.

30. The clutch assembly of claim 29, further comprising a first thrust bearing interposed between said drive hub and said output shaft and a second thrust bearing interposed between said control plate and said output shaft.

31. The clutch assembly of claim 17, further comprising an oil pump rotatably driven by said output shaft thereby forcing an oil through said clutch assembly.

32. The clutch assembly of claim 31, further comprising a plurality of oil distribution apertures connected to a shaft cavity where said oil pump forces oil into said shaft cavity and into said oil distribution apertures.

33. A clutch assembly for rotationally coupling two rotatable shafts comprising:

an input shaft rotatable about an axis of rotation;

an output shaft rotatable about an axis of rotation;

a ball ramp mechanism for generating a clamping force comprising; an annular control plate having an axis of rotation, said control plate having a plurality of circumferential control ramps formed in a face of said control plate, said control ramps varying in axial depth, an equivalent number of rolling elements one occupying each of said control ramps, an activation plate mounted to said input shaft through a first one-way clutch having an axis of rotation coaxial with said axis of rotation of said control plate, said activation plate having a plurality of activation ramps substantially identical in number, shape and radial position to said control ramps where said activation ramps at least partially oppose said control ramps and where each of said rolling elements is contained between one of said activation ramps and a respective control ramp, said control plate being axially and rotationally moveably disposed relative to said activation plate, said control plate having an annular control extension radially extending therefrom and said activation plate having an annular activation extension radially extending therefrom;

an annular intermediate plate nonrotatably connected to said output shaft and disposed between said control extension and said activation extension;

a coil for creating of an electromagnetic field in a coil armature upon introduction of an electrical current in said coil where said coil armature is mounted to said input shaft through a second one-way clutch;

a clutch pack for frictionally rotatably connecting said output shaft to said input shaft upon application of said clamp load generated by said ball ramp mechanism;

a plurality of circumferential slots formed in said coil armature and in said control extension and in said intermediate plate and in said activation extension;

a first slip joint interposed between said control plate and said control extension;

a second slip joint interposed between said activation plate and said activation extension;

a gap sleeve contacting said activation extension and said control plate for limiting the separation distance between said activation extension, said intermediate plate, and said control extension and said coil armature;

where upon introduction of an electrical current in said coil an electromagnetic field is generated to rotationally couple said coil armature to said control extension and said control extension to said intermediate plate and said intermediate plate to said activation extension.

34. The clutch assembly of claim 33, further comprising an oil pump driven from said input shaft for providing pressurized oil to said clutch assembly.

35. The clutch assembly of claim 34, further comprising a shaft cavity formed in said input shaft for distributing said pressurized oil to at least one oil distribution aperture formed in said input shaft.

* * * * *